(12) United States Patent
Hsieh

(10) Patent No.: US 11,051,585 B2
(45) Date of Patent: Jul. 6, 2021

(54) MOLD AND METHOD FOR GETTING FOOT MODEL THEREOF

(71) Applicant: Chun-Yen Hsieh, Taichung (TW)

(72) Inventor: Chun-Yen Hsieh, Taichung (TW)

(*) Notice: Subject to any disclaimer, the term of this patent is extended or adjusted under 35 U.S.C. 154(b) by 121 days.

(21) Appl. No.: 16/294,897

(22) Filed: Mar. 6, 2019

(65) Prior Publication Data

US 2019/0200702 A1 Jul. 4, 2019

Related U.S. Application Data

(62) Division of application No. 15/220,381, filed on Jul. 26, 2016, now Pat. No. 10,232,577.

(30) Foreign Application Priority Data

Jul. 27, 2015 (TW) .................................. 104124272

(51) Int. Cl.
| | |
|---|---|
| *B29C 33/40* | (2006.01) |
| *A43B 17/00* | (2006.01) |
| *B29C 33/38* | (2006.01) |
| *A43B 17/14* | (2006.01) |
| *A43D 1/02* | (2006.01) |
| *B29D 35/12* | (2010.01) |
| *B29L 31/50* | (2006.01) |

(52) U.S. Cl.
CPC ............ *A43B 17/003* (2013.01); *A43B 17/14* (2013.01); *A43D 1/022* (2013.01); *B29C 33/3857* (2013.01); *B29D 35/122* (2013.01); *B29D 35/128* (2013.01); *B29C 2033/3871* (2013.01); *B29L 2031/507* (2013.01)

(58) Field of Classification Search
None
See application file for complete search history.

(56) References Cited

U.S. PATENT DOCUMENTS

| 4,510,636 A * | 4/1985 | Phillips .................... A43D 1/00 |
| | | 12/1 R |
| 2009/0273109 A1* | 11/2009 | Johnson ............... B29D 35/128 |
| | | 264/40.5 |
| 2013/0174445 A1* | 7/2013 | Hakkala ................. A43D 1/022 |
| | | 36/43 |

* cited by examiner

*Primary Examiner* — Alexander M Weddle
(74) *Attorney, Agent, or Firm* — CKC & Partners Co., LLC

(57) ABSTRACT

A mold stepped on by a foot includes a seat, a plurality of telescopic rods, an image capturing device and an insole material. The telescopic rods are parallel to each other and are disposed in the seat. The telescopic rods stepped on by the foot generate a plurality of restoring forces, respectively. The image capturing device is disposed on the seat. The telescopic rods are captured by the image capturing device to generate a plurality of three-dimensional data of the telescopic rods. The insole material is disposed below the telescopic rods for molding an insole.

4 Claims, 17 Drawing Sheets

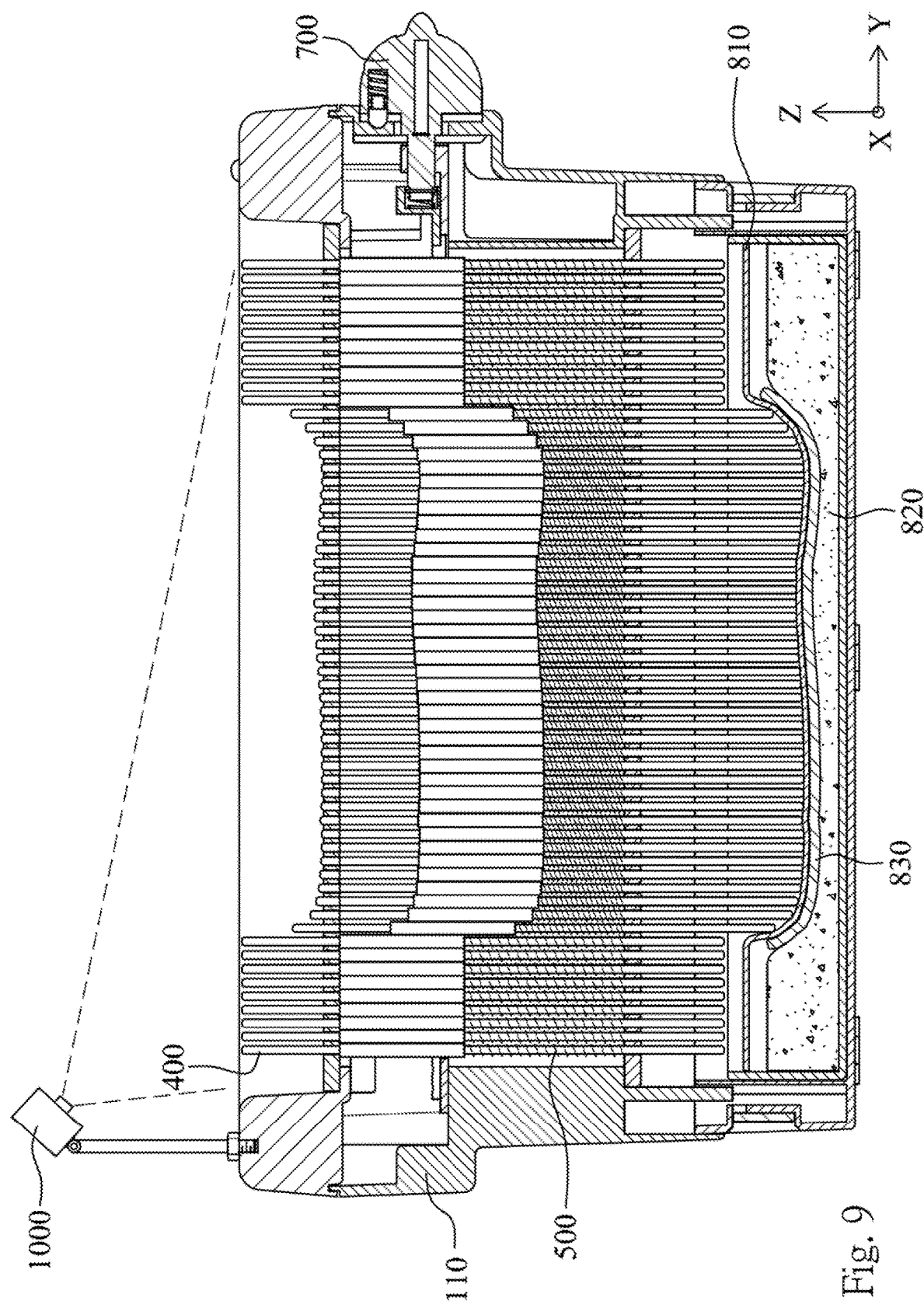

MOLD AND METHOD FOR GETTING FOOT MODEL THEREOF

RELATED APPLICATIONS

The present application is a Divisional Application of the U.S. application Ser. No. 15/220,381, filed Jul. 26, 2016, now U.S. Pat. No. 10,232,577 issued on Mar. 19, 2019, which claims priority to Taiwan Application Serial Number 104124272, filed Jul. 27, 2015, all of which are herein incorporated by reference.

BACKGROUND

Technical Field

The present disclosure relates to a mold. More particularly, the present disclosure relates to a mold and a method for getting a foot model thereof.

Description of Related Art

An ideal insole should be custom-fit which completely corresponds to the shape of a foot of a user under partial or full weight-bearing. One conventional manufacturing procedure for custom-fit insoles is using a plaster casting with an added insert to form the user-specific insole mold. Then, the manufacturer utilizes the insole mold to generate an insole corresponding to the foot. This conventional custom-fit insole manufacturing procedure is complex, thereby increasing the manufacturing time and the manufacturing cost.

Another conventional custom-fit insole manufacturing procedure is using a digital foot model of the user obtained via a foot shape capturing device. The foot shape capturing device works by capturing directly an image of the sole of the foot of the user without the sole contacting the ground or a weight-bearing surface. Then, a computer connected to the foot shape capturing device reconstructs the digital foot model via the image. The manufacturer then utilizes numerically controlled machining tools to generate an insole according to the digital foot model. Therefore, such conventional custom-fit insole manufacturing methods are usually expensive. In addition, when the user stands on the ground whether under partial or full weight-bearing, the shape of the foot and the sole will be changed due to the weight of the user and the user's stance. Conventional noncontact image-based foot shape capturing devices do not consider this change of the shape of the foot stepped on the ground and manual intervention by therapists to correct the alignment of the foot bones also intervenes the image capturing, so insoles manufactured using conventional methods cannot perfectly match the user's foot shape under weight-bearing whether with or without bone alignment corrections. Therefore, it is desirable to develop a customizable mold that enables low cost and rapid manufacturing of custom-fit insoles that completely match the sole of the foot under body weight-bearing conditions.

SUMMARY

According to one aspect of the present disclosure, a mold stepped on by a foot includes a seat, a plurality of telescopic rods, an image capturing device and an insole material. The telescopic rods are parallel to each other and are disposed in the seat. The telescopic rods stepped on by the foot generate a plurality of restoring forces, respectively. The image capturing device is disposed on the seat. The telescopic rods are captured by the image capturing device to generate a plurality of three-dimensional data of the telescopic rods. The insole material is disposed below the telescopic rods for molding an insole.

According to another aspect of the present disclosure, a method for getting a foot model includes a pressing step, a positioning step, an obtaining mold cavity step and a manufacturing insole step. The pressing step is for pressing a plurality of telescopic rods of a mold by a foot of a user. The positioning step is for positioning the telescopic rods via a sliding device. The obtaining mold cavity step is for obtaining a mold cavity via the telescopic rods. The manufacturing insole step is for manufacturing an insole corresponding to the mold cavity via an insole material.

BRIEF DESCRIPTION OF THE DRAWINGS

The present disclosure can be more fully understood by reading the following detailed description of the embodiment, with reference made to the accompanying drawings as follows:

FIG. 9 shows a schematic view of the mold for capturing three-dimensional data of FIG. 6;

DETAILED DESCRIPTION

Figure 1:
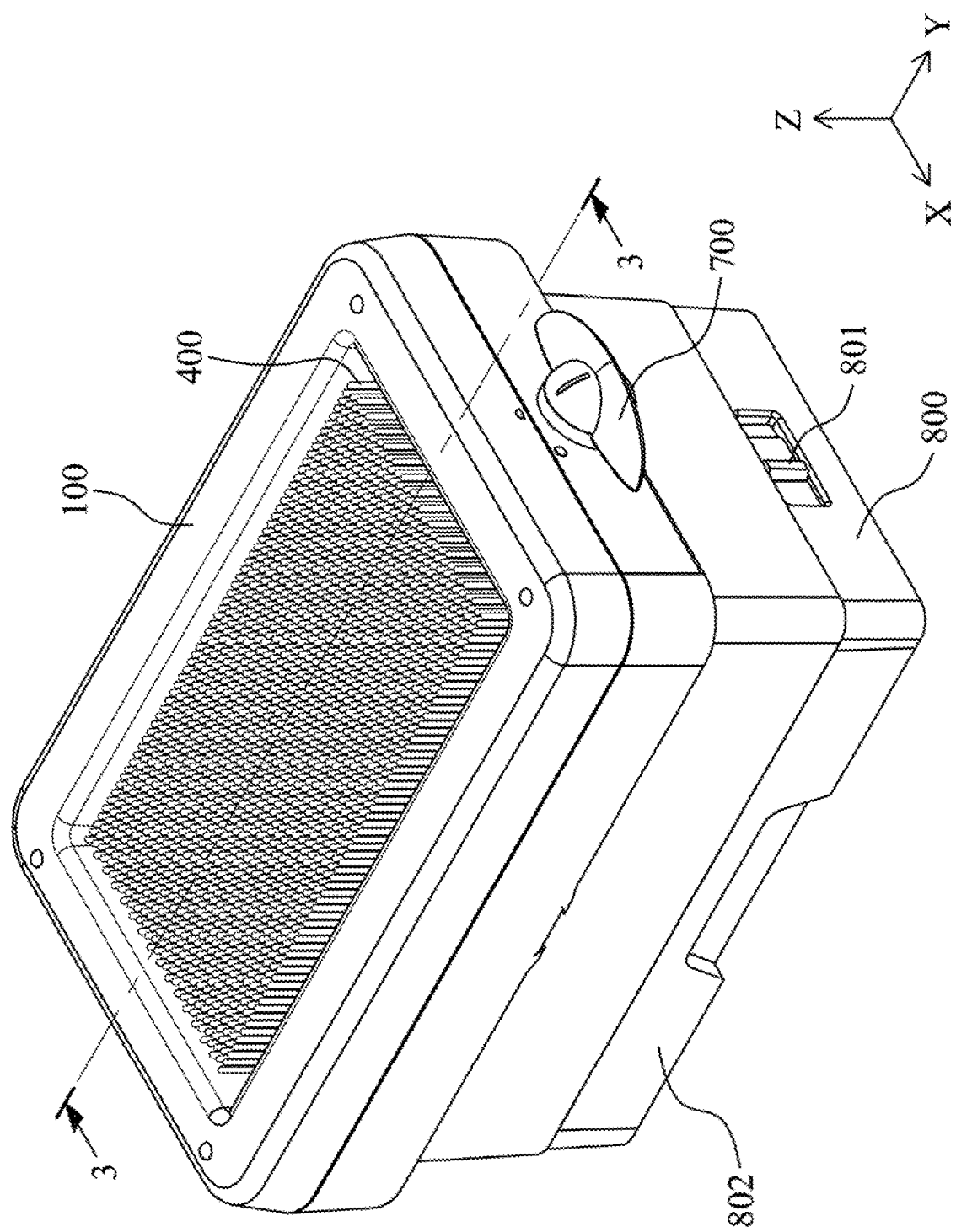
FIG. 1 shows a schematic view of mold according to one embodiment of the present disclosure.
Figure 2:
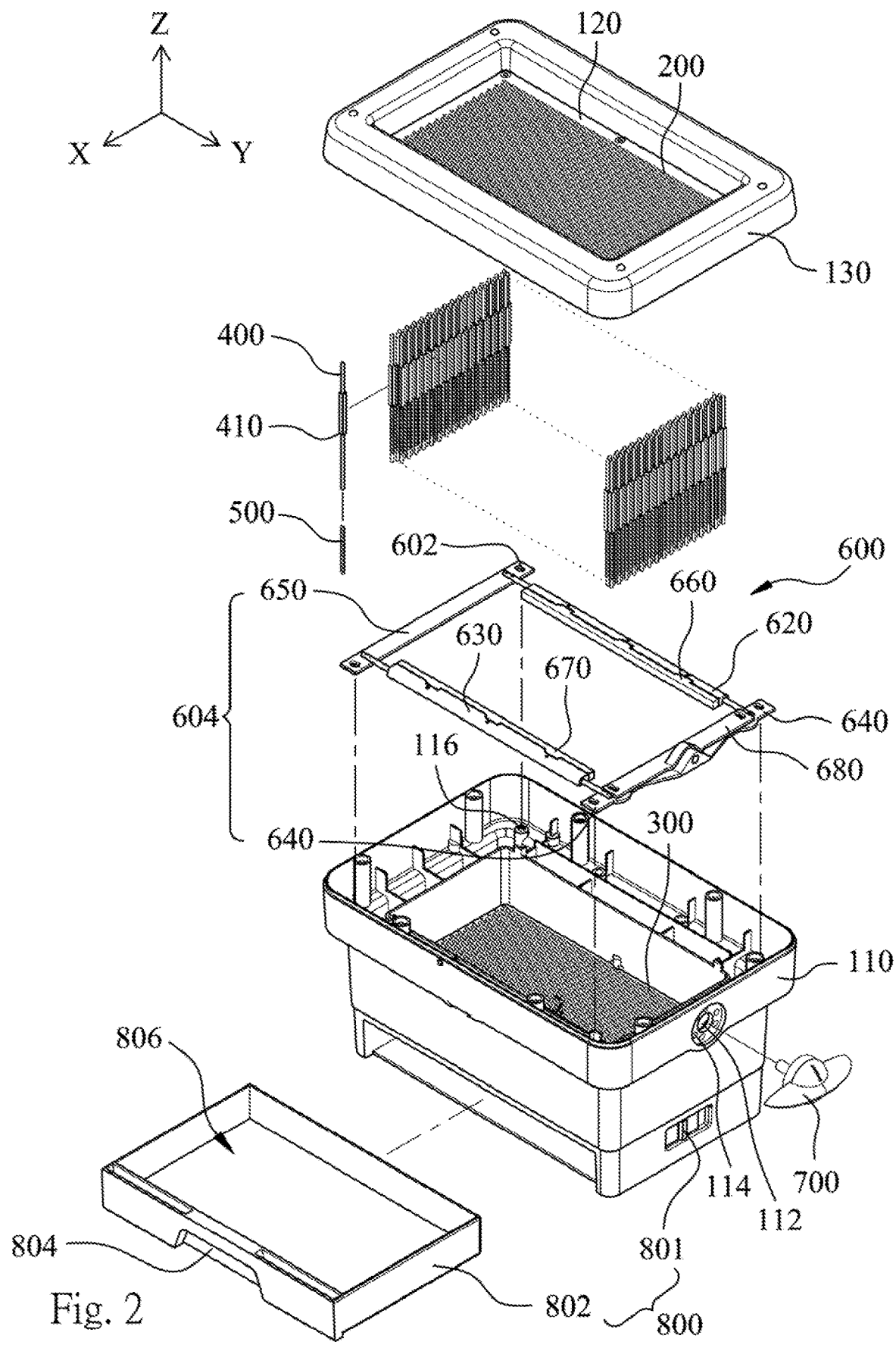
FIG. 2 shows an exploded view of the mold of FIG. 1.
Figure 3:
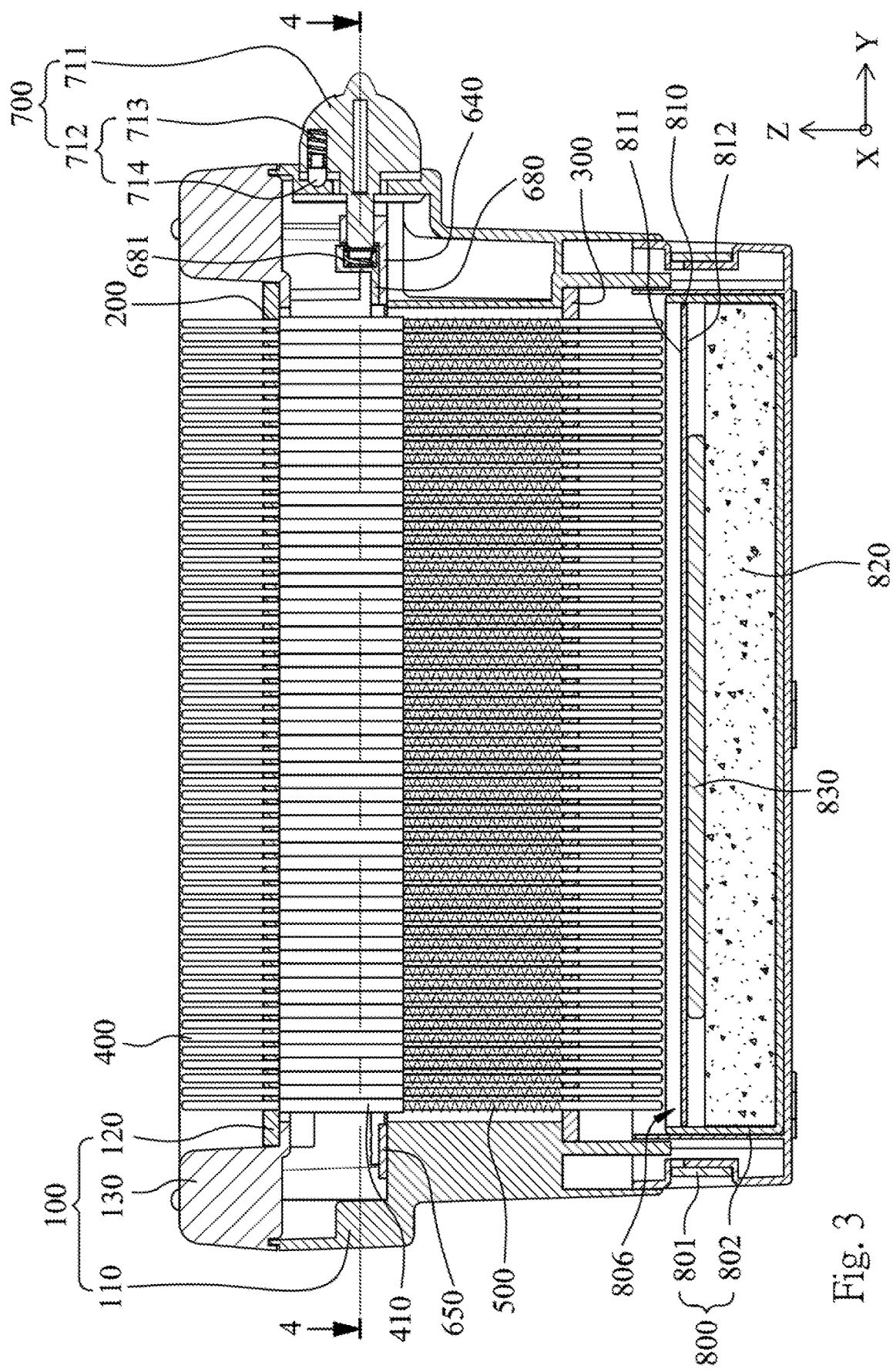
FIG. 3 shows a cross-sectional view of the mold of FIG. 1.
Figure 4:
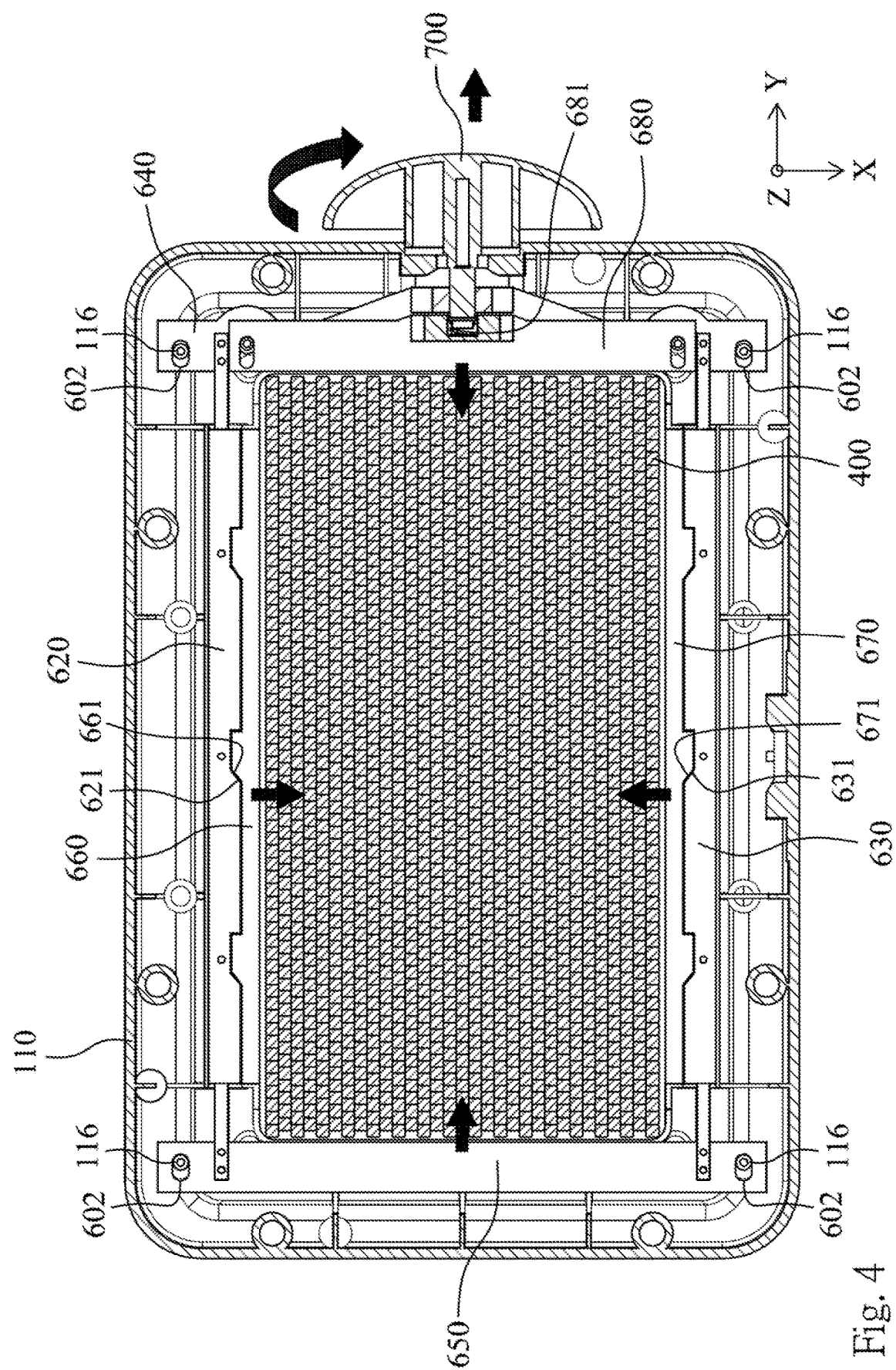
FIG. 4 shows a cross-sectional view of the mold of FIG. 3.
Figure 5:
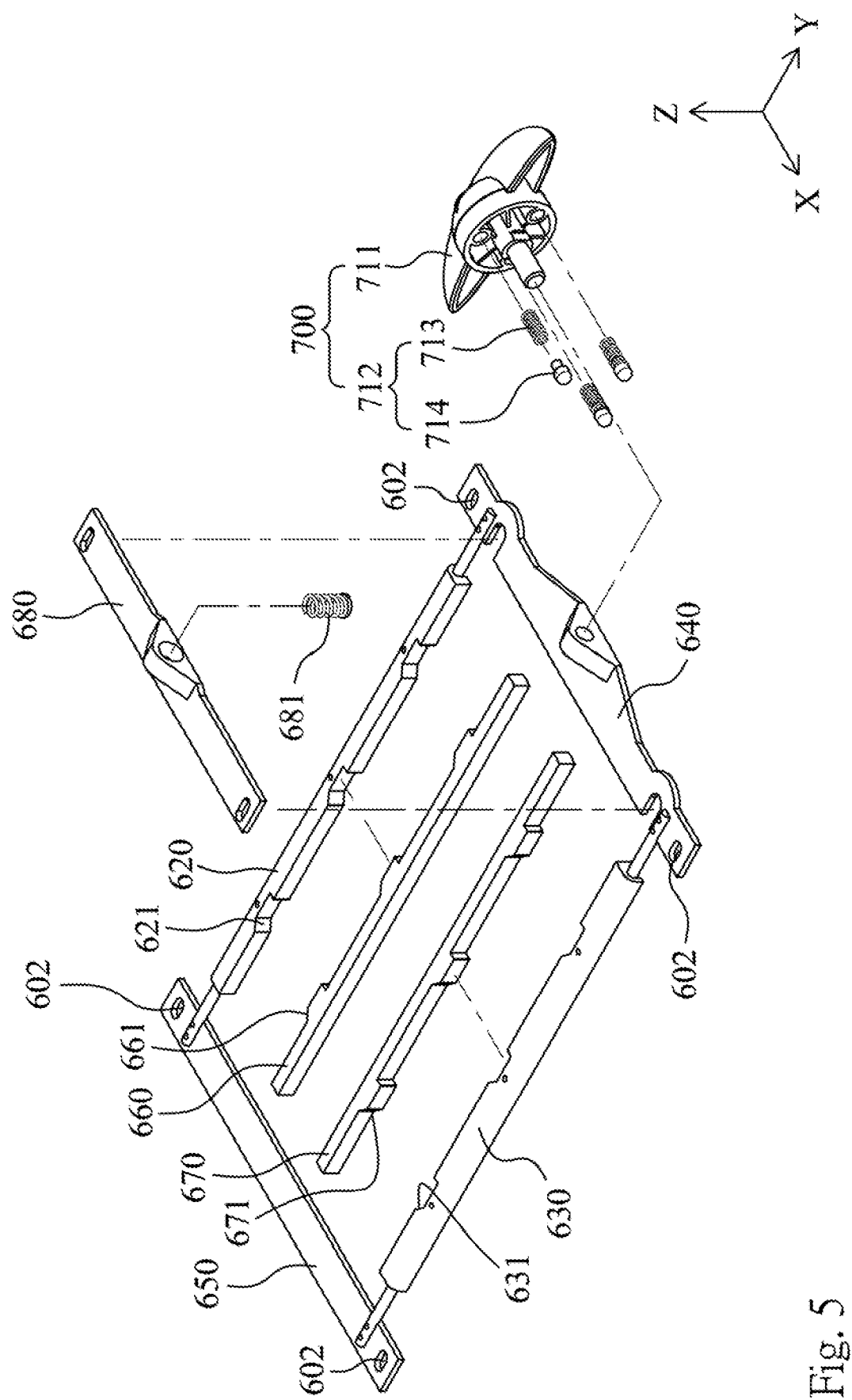
FIG. 5 shows an exploded view of a sliding device and a positioning member of the mold of FIG. 2.

FIG. 1 shows a schematic view of a mold according to one embodiment of the present disclosure; FIG. 2 shows an exploded view of the mold of FIG. 1; FIG. 3 shows a cross-sectional view of the mold of FIG. 1; FIG. 4 shows a cross-sectional view of the mold of FIG. 3; and FIG. 5 shows an exploded view of a sliding device 600 and a positioning member 700 of the mold of FIG. 2. The mold stepped on by a foot includes a seat 100, a plurality of guiding tracks 200, a plurality of positioning grooves 300, a plurality of telescopic rods 400, a plurality of elastic members 500, the sliding device 600, the positioning member 700 and a drawer module 800.

The seat 100 includes a base portion 110, a guiding portion 120, a housing 130 and a space. The base portion 110 is connected to the housing 130, and includes a hole 112, six concaves 114 and four locking elements 116. The guiding portion 120 is disposed in the housing 130. The space is located in the base portion 110 and the housing 130. The space is corresponding to the foot. The hole 112 is located at one side of the base portion 110 and is surrounded by the six concaves 114. The four locking elements 116 are located at four corners of the base portion 110, respectively. The guiding tracks 200 are disposed on the seat 100 and have circular shapes. In detail, the guiding tracks 200 are disposed on the plate-shaped guiding portion 120. The positioning grooves 300 are disposed on the seat 100 and are corresponding to the guiding tracks 200, respectively.

The telescopic rods 400 are parallel to each other and include a plurality of abutting portions 410, respectively. The abutting portions 410 are connected to each other and are disposed in the seat. In detail, each of the abutting portions 410 has an octagonal columnar shape and is connected to the other corresponding abutting portions 410 around itself. One end of each of the telescopic rods 400 is passed through and protruded from each of the guiding tracks 200 for being stepped on by the foot. The other end of each of the telescopic rods 400 is passed through each of the positioning grooves 300. In other words, the abutting portions 410 are movable and located between the guiding tracks 200 and the positioning grooves 300 so as to keep the telescopic rods 400 in the seat 100.

The elastic members 500 are disposed in the seat 100 for applying a plurality of restoring forces to the telescopic rods 400, respectively. Each of the telescopic rods 400 is passed through each of the elastic members 500 and is disposed between the abutting portions 410 and the positioning grooves 300. In detail, the other end of each of the telescopic rods 400 is passed through each of the elastic members 500 first. Then, the other end of each of the telescopic rods 400 is passed through each of the positioning grooves 300, so that the elastic members 500 is located between the abutting portions 410 and the positioning grooves 300. Therefore, the telescopic rods 400 stepped on by the foot of a user can generate the restoring forces via the elastic members 500, respectively.

The sliding device 600 includes four tracks 602, a sliding member 604, a first connecting member 620, a second connecting member 630, a first positioning element 660, a second positioning element 670 and a third positioning element 680. The sliding device 600 is disposed on the seat 100 for locking the telescopic rods 400. The four tracks 602 are disposed on the sliding member 604. In detail, the sliding member 604 includes a first sliding rod 640 and a second sliding rod 650. Two tracks 602 are disposed on the first sliding rod 640, and the other two tracks 602 are disposed on the second sliding rod 650. An extending direction of each of the tracks 602 is non-parallel to an extending direction of each of the guiding tracks 200. The sliding member 604 is corresponding to the abutting portions 410 of the telescopic rods 400. The first sliding rod 640 and the second sliding rod 650 are perpendicularly connected to two opposite sides of the abutting portions 410, respectively. The four locking elements 116 of the base portion 110 are passed through the two tracks 602 of the first sliding rod 640 and the two tracks 602 of the second sliding rod 650, respectively, so that the sliding member 604 can be moved on the locking elements 116 according to the four tracks 602. Moreover, two ends of the first connecting member 620 are connected to one end of the first sliding rod 640 and one end of the second sliding rod 650, respectively. Two ends of the second connecting member 630 are connected to the other end of the first sliding rod 640 and the other end of the second sliding rod 650, respectively. In this way, the first connecting member 620, the second connecting member 630, the first sliding rod 640 and the second sliding rod 650 are connected together to form a rectangular frame. The rectangular frame can be moved in a Y-axis direction via the positioning member 700. The first connecting member 620, the second connecting member 630, the first sliding rod 640 and the second sliding rod 650 are moved in the same direction. The second sliding rod 650, the first positioning element 660, the second positioning element 670 and the third positioning element 680 are used to lock the abutting portions 410 of the telescopic rods 400. The first sliding rod 640 is connected to the third positioning element 680, and a positioning spring 681 is disposed between the first sliding rod 640 and the third positioning element 680. The positioning spring 681 is configured to press the third positioning element 680, so that the third positioning element 680 is moved in a negative Y-axis direction to position the telescopic rods 400. The second sliding rod 650 of the sliding member 604 is movable along the track 602 in a positive Y-axis direction to press one side of the abutting portions 410, and the abutting portions 410 are tightly connected to each other so as to position the telescopic rods 400.

In FIG. 5, the first connecting member 620 includes a first inclined portion 621, and the first positioning element 660 includes a second inclined portion 661 corresponding to the first inclined portion 621. The second connecting member 630 includes a third inclined portion 631, and the second positioning element 670 includes a fourth inclined portion 671 corresponding to the third inclined portion 631. In order to press the telescopic rods 400 bi-directionally, the first inclined portion 621 is engaged with the second inclined portion 661, and the third inclined portion 631 is engaged with the fourth inclined portion 671. By means of horizontal and vertical components of the force of the inclined portions, the first connecting member 620 is moved in the positive Y-axis direction, so that the telescopic rods 400 are pressed by the first positioning element 660 in a positive X-axis direction. The second connecting member 630 is moved in the positive Y-axis direction, so that the telescopic rods 400 are pressed by the second positioning element 670 in a negative X-axis direction. In addition, the first connecting member 620 and the second connecting member 630 are symmetrical along the Y-axis direction. The first positioning element 660 and the second positioning element 670 are symmetrical along the Y-axis direction and are moved in opposite directions. The second sliding rod 650 and the third positioning element 680 are moved in opposite directions. The first connecting member 620, the second connecting member 630, the first positioning element 660 and the second positioning element 670 all have three inclined portions. The total number of the inclined portions and a distance between any two adjacent inclined portions can be decided by a manufacturer, and the minimum number of the inclined portions must be one.

In FIG. 5, the engagement structure of the sliding device 600 combined with the operation of positioning member 700 can provide a bi-directional locking mechanism to position the telescopic rods 400. The bi-directional locking mechanism may be divided into a first directional lock and a second directional lock. The first directional lock represents that the first positioning element 660 and the second positioning element 670 are moved in the X-axis direction. The second directional lock represents that the second sliding rod 650 and the third positioning element 680 are moved in the Y-axis direction. By means of the bi-directional locking mechanism, the telescopic rods 400 can completely make and maintain a mold cavity corresponding to the shape of the foot. Moreover, an insole mold corresponding to the mold cavity can be manufactured by a plastic material. The insole mold may be used repeatedly, so that a measuring time can be reduced without re-measurement.

In FIGS. 2 and 5, the positioning member 700 is disposed on the seat 100. The first sliding rod 640 of the sliding member 604 of the sliding device 600 is moved in the Y-axis direction by the positioning member 700. In detail, the positioning member 700 includes a knob 711 and three spring modules 712. The base portion 110 includes an opening 112 and six recesses 114 for disposing the positioning member 700 on the base portion 110. The positioning member 700 is passed through the opening 112 to engage with the first sliding rod 640. In order to screwingly move and lock the positioning member 700 on the first sliding rod 640, the three spring modules 712 corresponding to the six recesses 114 are utilized to prevent the rotation of the knob 711. Each spring module 712 has a spring 713 and a circular convex portion 714. Each circular convex portion 714 is engaged with one of the recesses 114. In other words, the three circular convex portions 714 of the positioning member 700 are engaged with three of the six recesses 114 of the base portion 110, respectively. When the knob 711 is rotated, the positioning member 700 is moved in the Y-axis direction, and the third positioning element 680 is moved by the positioning member 700. When the circular convex portion 714 of the spring module 712 is engaged with one of the recesses 114 of the base portion 110, the spring modules 712 are locked, thereby preventing the knob 711 from rotating. The knob 711 has a flat circular shape and may be easily accessed by the user's fingers.

The abutting portions 410 of the telescopic rods 400 may have an octagonal shape, a hexagonal shape, a circular shape, a rectangular shape or a square shape. A preferred embodiment of the abutting portions 410 employs the octagonal shape to increase the operational stability of the abutting portions 410, and the telescopic rods 400 cannot be rotated, so that the telescopic rods 400 are more stable. Furthermore, the guiding tracks 200 are disposed on the guiding portion 120. The positioning grooves 300, the elastic members 500 and the sliding device 600 are disposed in the base portion 110. The base portion 110 is removably connected to the guiding portion 120, thereby significantly reducing manufacturing and assembly difficulties.

Figure 6:
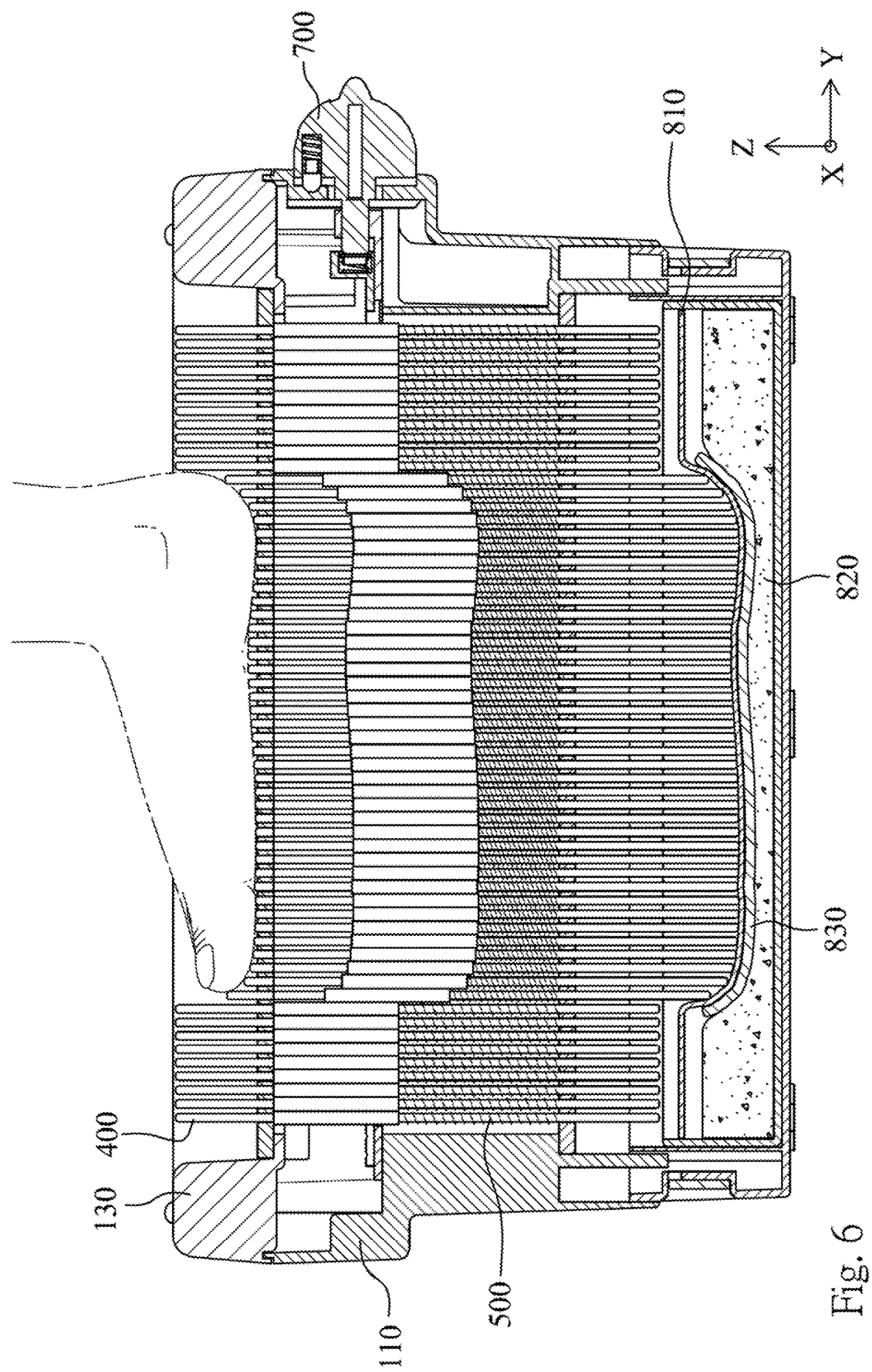
FIG. 6 shows a schematic view of the mold stepped on by a foot of FIG. 3.

In FIGS. 2, 3 and 6, the drawer module 800 is used for shaping of an insole material 830 which can be disposed in the drawer module 800 and disposed below the telescopic rods 400 for molding an insole. The drawer module 800 is connected to a bottom of the seat 100. The drawer module 800 includes a switch 801 and a drawer 802. The switch 801 is configured to separate the drawer module 800 from the seat 100 or engage the drawer module 800 with the seat 100. The drawer 802 includes a handle 804, an accommodating space 806, a silicone film 810 and a foam material 820. The handle 804 is used to easily pull or push the drawer 802 by the user. The accommodating space 806 is configured to dispose the insole material 830 in the drawer 802. The drawer 802 is configured to conveniently put the insole material 830 into the drawer module 800 or take out the insole material 830 from the drawer module 800. In addition, the silicone film 810 includes a top surface 811 and a bottom surface 812. The silicone film 810 is disposed in the accommodating space 806 of the drawer 802 and is located between the insole material 830 and the telescopic rods 400. When the top surface 811 of the silicone film 810 is pressed by the telescopic rods 400, a plurality of concave portions are formed on the top surface 811 and are corresponding to the telescopic rods 400, respectively. The bottom surface 812 is tightly connected to the insole material 830. The silicone film 810 is configured to prevent the telescopic rods 400 from directly pressing the insole material 830 due to the silicone film 810 located between the insole material 830 and the telescopic rods 400. When the top surface 811 of the silicone film 810 is pressed by the telescopic rods 400, the bottom surface 812 of the silicone film 810 and the insole material 830 exhibit a smooth curve which is corresponding to the shape of the foot so as to avoid the insole material 830 forming the concave portions having uneven shapes. The foam material 820 is disposed below the insole material 830 and is a kind of buffer material. The foam material 820 is used to absorb excessive pressure from the insole material 830.

Figure 13A:
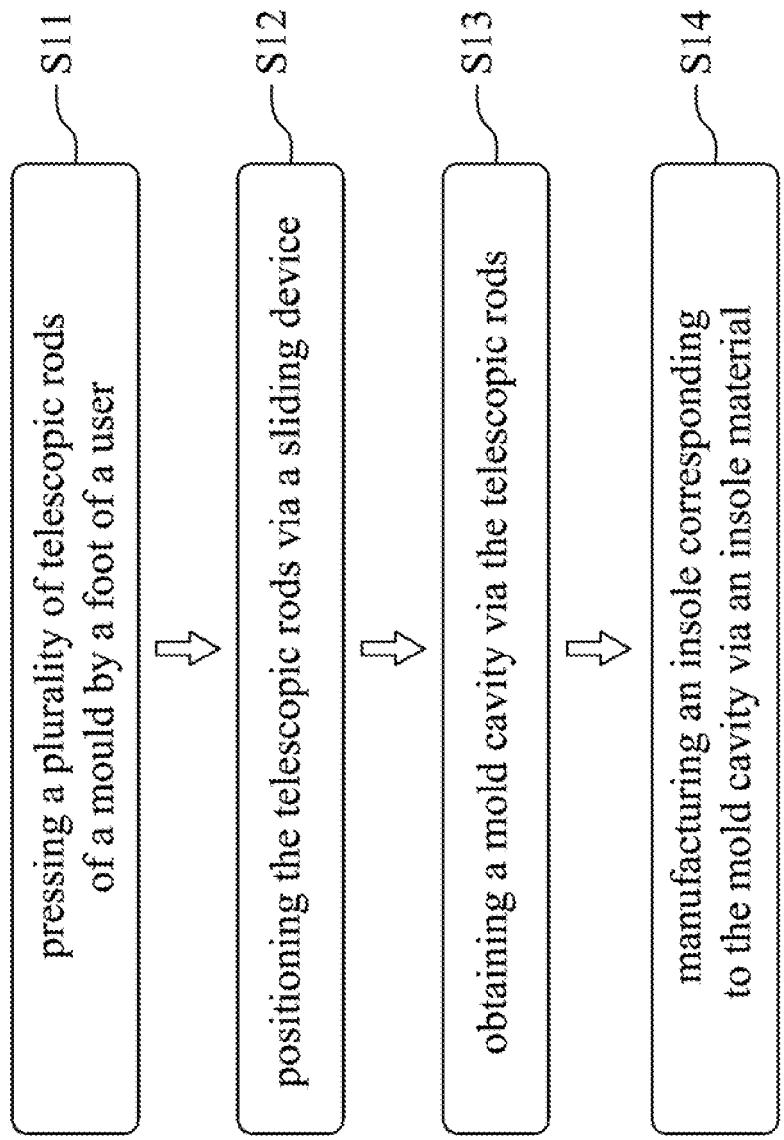
FIG. 13A shows a flow chart of a method for getting an foot model according to one embodiment of the present disclosure.
Figure 13B:
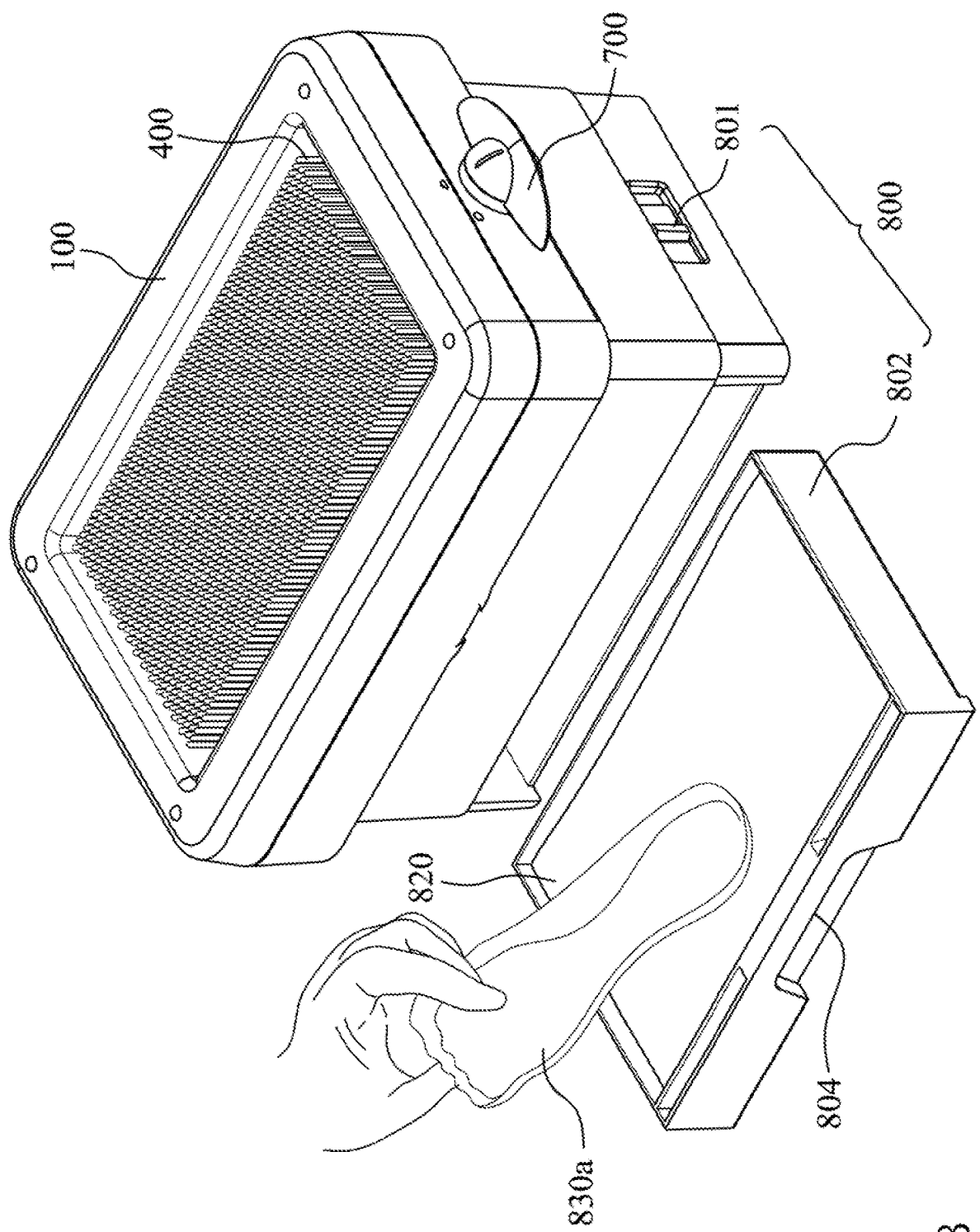
FIG. 13B shows a schematic view of n insole taken out from a drawer according to the method of FIG. 13A.

FIG. 6 shows a schematic view of the mold stepped on by the foot of FIG. 3; FIG. 13A shows a flow chart of a method for obtaining the insole mold according to one embodiment of the present disclosure; and FIG. 13B shows a schematic view of an insole taken out from the drawer 802 according to the method of FIG. 13A. In FIG. 13A, the method for getting the foot model includes a pressing step S11, a positioning step S12, an obtaining mold cavity step S13 and a manufacturing insole step S14. The pressing step S11 is for pressing the telescopic rods 400 of the mold by the foot of the user. The telescopic rods 400 are moved in a negative Z-axis direction by exerting an external force provided by the foot of the user. The elastic members 500 which are disposed below the telescopic rods 400 provide the restoring forces. The external force given by the foot is greater than the restoring forces given by the elastic members 500. The positioning step 812 is for positioning the telescopic rods 400 via the sliding device 600. The sliding device 600 combined with the operation of positioning member 700 provides the bi-directional locking mechanism to tightly position the telescopic rods 400. The obtaining mold cavity step 813 is for obtaining a mold cavity via the telescopic rods 400. The mold cavity is formed above the telescopic rods 400 and is corresponding to the foot of the user. The manufacturing insole step 814 is for manufacturing an insole corresponding to the mold cavity via an insole material 830. The shape of the insole material 830 is corresponding to the mold cavity. In FIG. 13B, the insole material 830 is disposed below the telescopic rods 400 for molding the insole and quickly hardens to form the insole. The insole material 830 is placed at a proper location corresponding to a foot position. The shape of the insole material 830 is equal to the shape of the foot. The size of the insole material 830 is greater than or equal to the size of the foot. When the insole is formed by the insole material 830, the user can pull out the drawer 802 via the handle 804 and take out the insole from the drawer 802. The shape of the insole is equal to the shape of the foot. The size of the insole is greater than or equal to the size of the foot. In FIG. 6, the elastic members 500 exerts the restoring forces to the telescopic rods 400. When the telescopic rods 400 are pressed by the foot, the elastic members 500 pushes the telescopic rods 400 against the foot of the user by the restoring forces, so that the telescopic rods 400 are tightly connected to the foot at any time and the mold cavity of the telescopic rods 400 is corresponding to an actual deformation of the foot which steps on the ground. Even if the user changes the external force exerting on the telescopic rod 400, the telescopic rod 400 still can be tightly connected to the foot at any time via the restoring forces of the elastic members 500.

In FIG. 2, the sliding member 604 can be moved on the locking elements 116 according to the four tracks 602. The extending direction of the track 602 is non-parallel to the extending direction of each of the guiding tracks 200, so that the second sliding rod 650 and the third positioning element 680 are moved in opposite directions and are tightly connected to the abutting portions 410 of the telescopic rods 400. The abutting portions 410 produces an interlocking connection of the telescopic rods 400 so as to stably lock the telescopic rods 400 for obtaining the mold cavity. In addition, the insole mold is obtained by an impression of the mold cavity in the plastic material. The shape of the plastic material is corresponding to the mold cavity. The insole mold is used to manufacture the insole via the insole material 830. Therefore, the insole corresponding to the foot can be completely manufactured by the insole mold or the mold.

When the mold cavity shows the user's improper stance, the user's stance can be adjusted by a professional to match the proper and correct stance. This adjustment changes the movement of the telescopic rods 400, thereby producing the suitable mold cavity and the suitable insole for modifying the users improper stance.

In FIG. 2, the elastic members 500 which are disposed below the telescopic rods 400 provide the restoring forces. The elastic members 500 are disposed in the positioning grooves 300. In other embodiments, the elastic members 500 are disposed above the telescopic rods 400. Two ends of each of the elastic members 500 are connected to the guiding portion 120 of the seat 100 and each of the abutting portions 410 of the telescopic rods 400, respectively. This structure can achieve the same effect as the embodiment of FIGS. 2 and 3.

Figure 7:
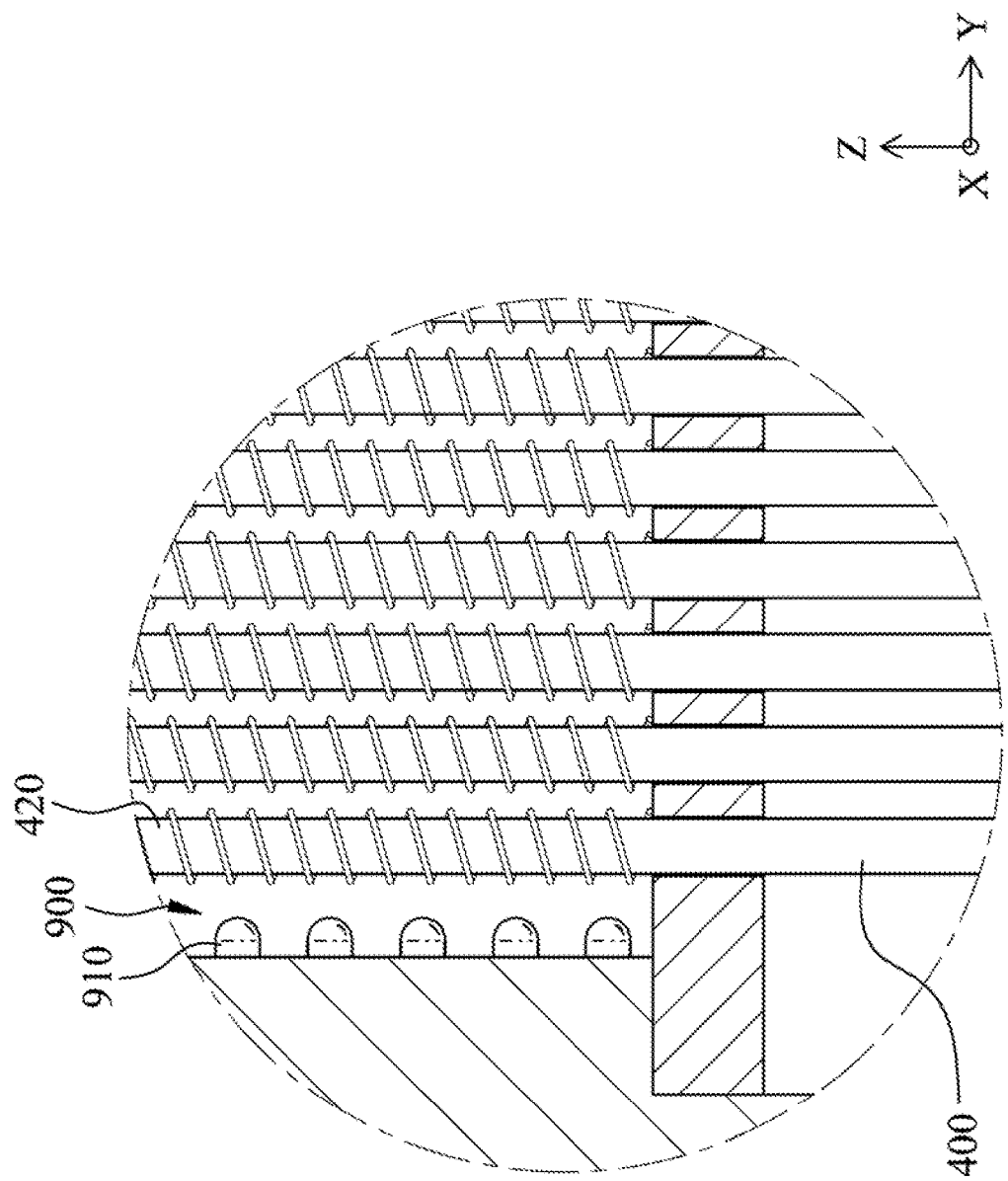
FIG. 7 shows a schematic view of the mold according to another embodiment of the present disclosure.

FIG. 7 shows a schematic view of a mold according to another embodiment of the present disclosure. The difference between the embodiments shown in FIGS. 7 and 1 is that the mold of FIG. 7 further includes a plurality of light sources 900 which are disposed on the seat 100. Each of the light sources 900 includes a plurality of lighting elements 910 generating a plurality of light colors with different wavelengths, respectively. The lighting elements 910 of each of the light sources 900 are arranged according to a moving direction of the telescopic rods 400. The telescopic rods further include a plurality of transparent portions 420 which normally extend from the positioning grooves 300 to the top of the telescopic rods 400, respectively. The light sources 900 are corresponding to the transparent portions 420, respectively, and each light source 900 generates one of the light colors. When telescopic rods 400 are stepped on by the foot, each of the transparent portions 420 is corresponding to one of the lighting elements 910. In detail, the lighting elements 910 generating the different light colors are arranged according to the moving direction of the telescopic rods 400. When the telescopic rods 400 are stepped on by the foot, the telescopic rods 400 are exerted by the various external forces and are moved the different moving distances in the Z-axis direction, so that each of the transparent portions 420 is aligned to one of the lighting elements 910. Thus, the telescopic rods 400 generate the corresponding light colors via the lighting elements 910, respectively. The user can know each range of the external forces exerted on the telescopic rods 400 according to the light colors through visual observation by the user's eye.

For example, the lighting element 910 generating a red light is disposed below 1 cm from the transparent portion 420, and the lighting element 910 generating the a yellow light is disposed below 2 cm from the transparent portion 420. When the moving distance of the telescopic rod 400 is 1 cm, the transparent portion 420 is corresponding to the lighting element 910 generating the red light. When the moving distance of the telescopic rod 400 is 2 cm, the transparent portion 420 is corresponding to the lighting element 910 generating the yellow light. Hence, the user can know each range of the moving distances of the telescopic rods 400 according to the light colors through visual observation by the user's eye. Furthermore, the transparent portion 420 of the telescopic rod 400 is made of a transparent material, so that the light emitted from the lighting element 910 can pass through the transparent portion 420. The light can be emitted to outside of the telescopic rods 400, thereby allowing the user to mare easily observe the light colors of the telescopic rods 400.

Figure 8:
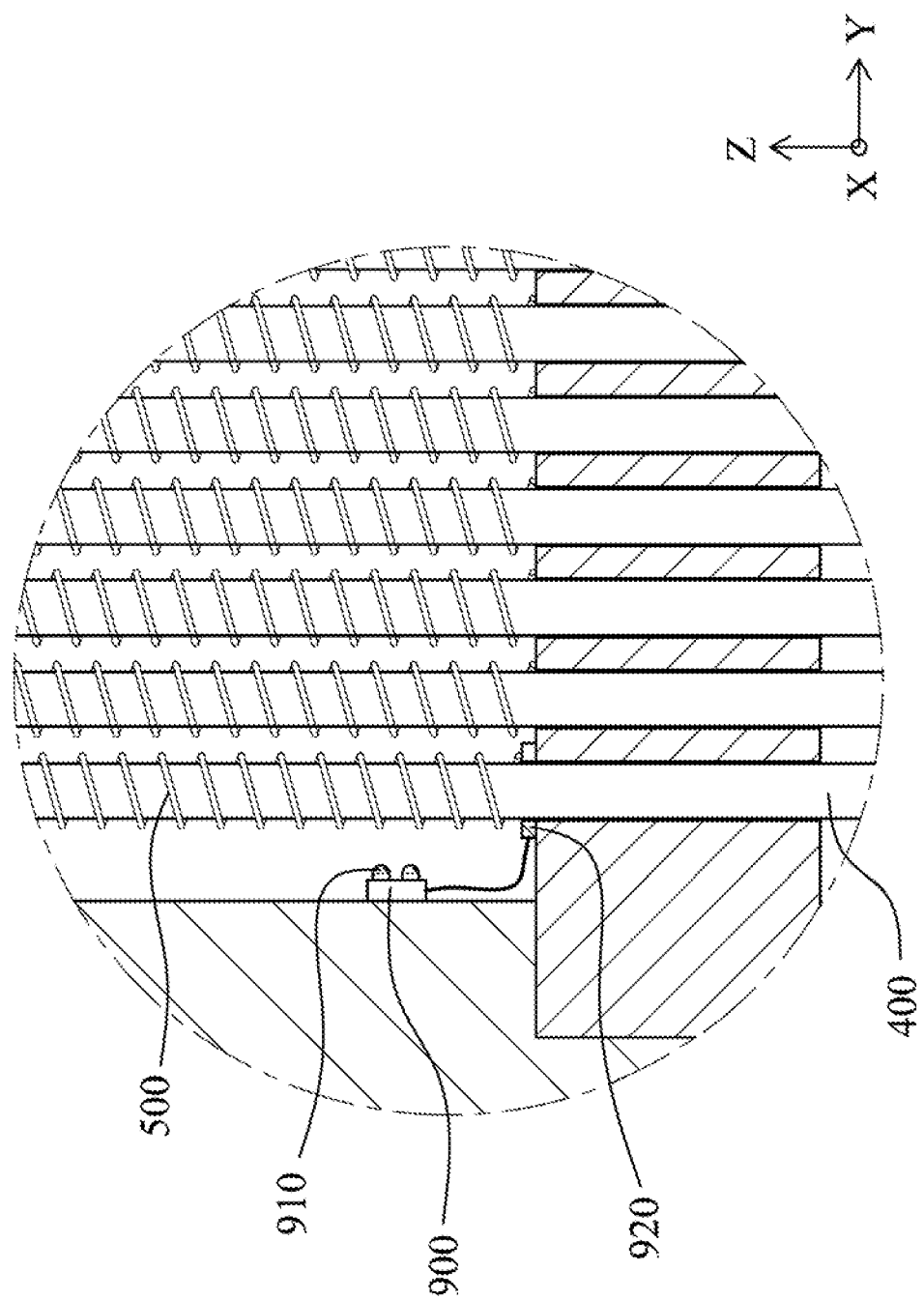
FIG. 8 shows a schematic view of the mold according to further another embodiment of the present disclosure.

FIG. 8 shows a schematic view of a mold according to further another embodiment of the present disclosure. The difference between the embodiments shown in FIGS. 8 and 1 is that the mold of FIG. 8 further includes a plurality of sensors 920 and a plurality of light sources 900. The sensors 920 are connected to the elastic members 500, respectively. The sensors 920 are configured to sense a plurality of forces exerted on the elastic members 500, respectively. The sensors 920 may either be mechanical or digital. The sensors 920 are turned on or turned off according, to the telescopic rods 400, respectively. When the sensors 920 obtain the forces exerted on the elastic members 500, the professional can know the users stance according to the forces and adjust the user's stance to match the proper and correct stance. For example, if the force of the heel is greater than the force of the toe, the professional may suggest the user to move the center of gravity toward the toe, thereby adjusting the user's stance to match the appropriate stance. Then, the insole or the insole mold corresponding the appropriate stance can be manufactured by the mold to correct the user's improper stance.

In FIG. 8, the light sources 900 are connected to and controlled by the sensors 920, respectively. Each light source 900 includes the lighting elements 910 having the light colors with different wavelengths. The light sources 900 are corresponding to the telescopic rods 400, respectively. The sensors 900 are configured to sense the forces exerted on the elastic members 500. The lighting elements 910 are turned on according to the sensors 920, respectively. Each turned-on lighting element 910 generates one of the light colors. For example, if the sensors 920 sense 1 N force applied by the elastic members 500, the lighting element 910 generating the red light is turned on. If the sensors 920 sense 2 N force applied by the elastic members 500, the lighting element 910 generating the yellow light is turned on. In this way, the user can know each range of the external forces exerted on the telescopic rods 400 according to the light colors of the lighting element 910 through visual observation.

Figure 14:
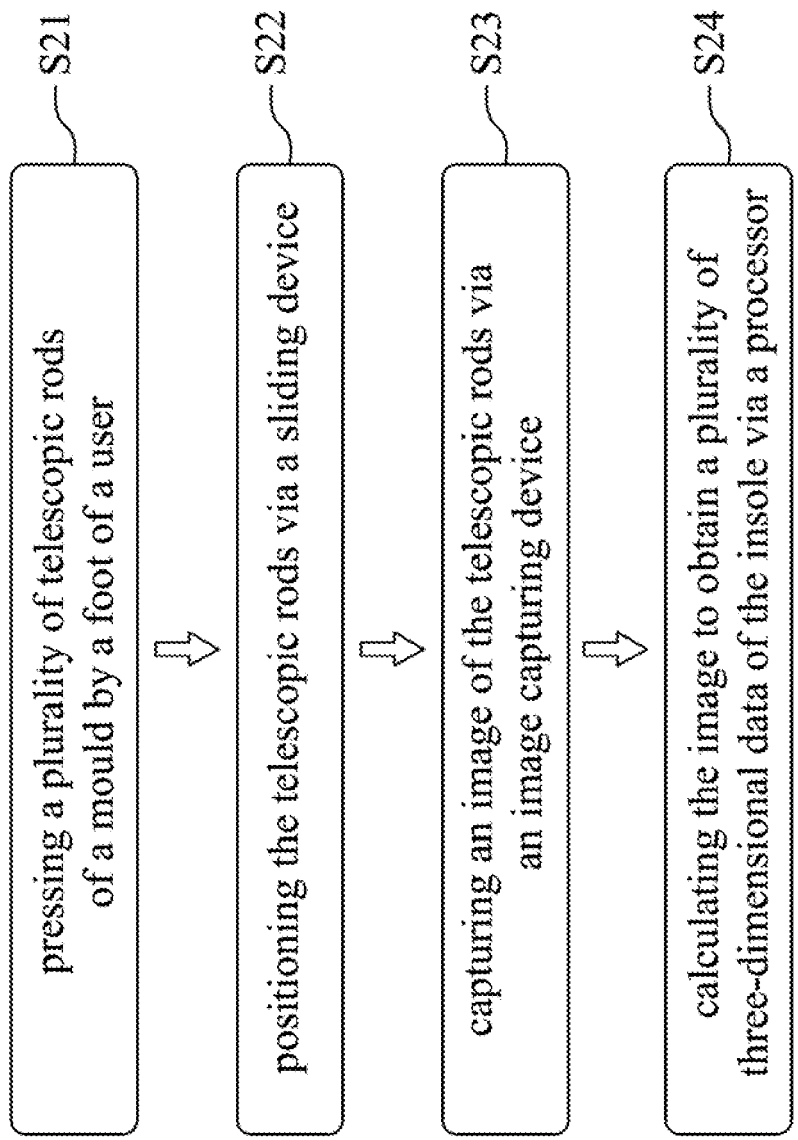
FIG. 14 shows a flow chart of a method for getting a foot model according to another embodiment of the present disclosure.

FIG. 9 shows a schematic view of the mold for capturing three-dimensional data of FIG. 6; and FIG. 14 shows a flow chart of a method for getting a foot model according to another embodiment of the present disclosure. In FIG. 9, the mold is used for capturing a plurality of three-dimensional data. The mold stepped on by the foot includes a seat 100, a plurality of telescopic rods 400, a plurality of light sources 900, an image capturing device 1000 and an insole material 830. The telescopic rods 400 are parallel to each other and disposed in the seat 100. The telescopic rods 400 stepped on by the foot generate a plurality of restoring forces, respectively. The light sources 900 are disposed on the seat 100. The light sources 900 are corresponding to the telescopic rods 400 and illuminate the telescopic rods 400, respectively. The light sources 900 generate a plurality of light colors via the telescopic rods 400, respectively. The image capturing device 1000 is disposed on the seat 100. The light colors transmitted through the telescopic rods 400 are captured by the image capturing device 1000 to generate the three-dimensional data of the telescopic rods 400. The insole material 830 is disposed below the telescopic rods 400 for molding an insole. When the insole is formed by the insole material 830, the user can take out the insole from the drawer 802. The image capturing device 1000 has an image capturing region which can cover all of tops of the telescopic rods 400.

In FIG. 14, the method for getting the foot model includes a pressing step 821, a positioning step S22, an image capturing step S23 and a calculating step S24. The pressing step S21 is for pressing the telescopic rods 400 of the mold by a foot of a user. The positioning step 822 is for positioning the telescopic rods 400 via a sliding device 600. The image capturing step 823 is for capturing an image of the telescopic rods 400 via an image capturing device 1000. The calculating step S24 is for calculating the image to obtain a plurality of three-dimensional data of the insole via a processor. The three-dimensional data is corresponding to the foot model and the mold cavity. In addition, the above-mentioned sensors 920 may be signally connected to the processor. The forces exerted on the elastic members 500 are obtained by the sensors 920. The data of the forces of the sensors 920 are combined with the three-dimensional data of the insole to create a database which shows the complete information about the user's foot. A display device (not shown) can be connected to the processor for showing the database.

Figure 10A:
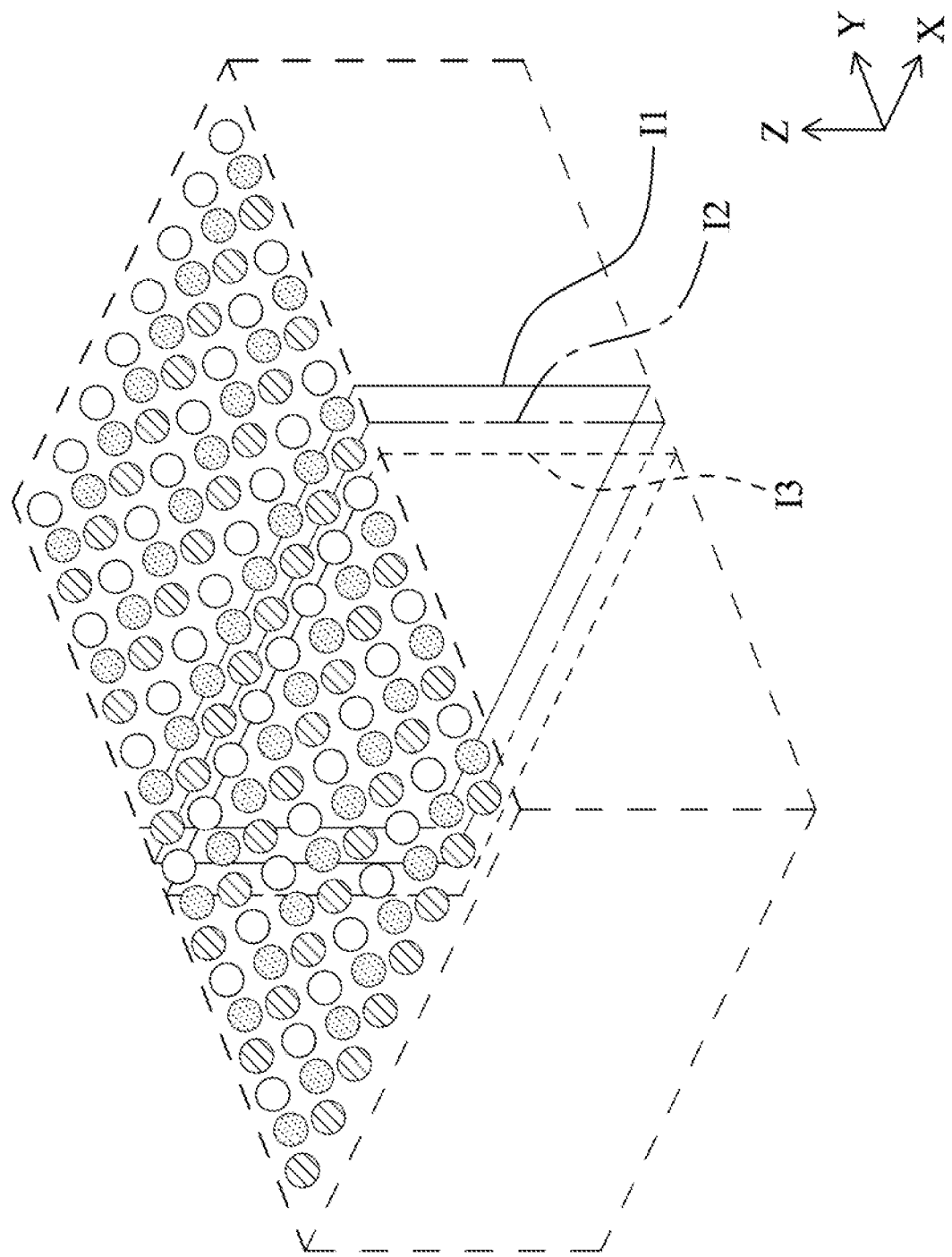
FIG. 10A shows a schematic view of a relationship between a plurality of planes of the telescopic rods of FIG. 6.
Figure 10B:
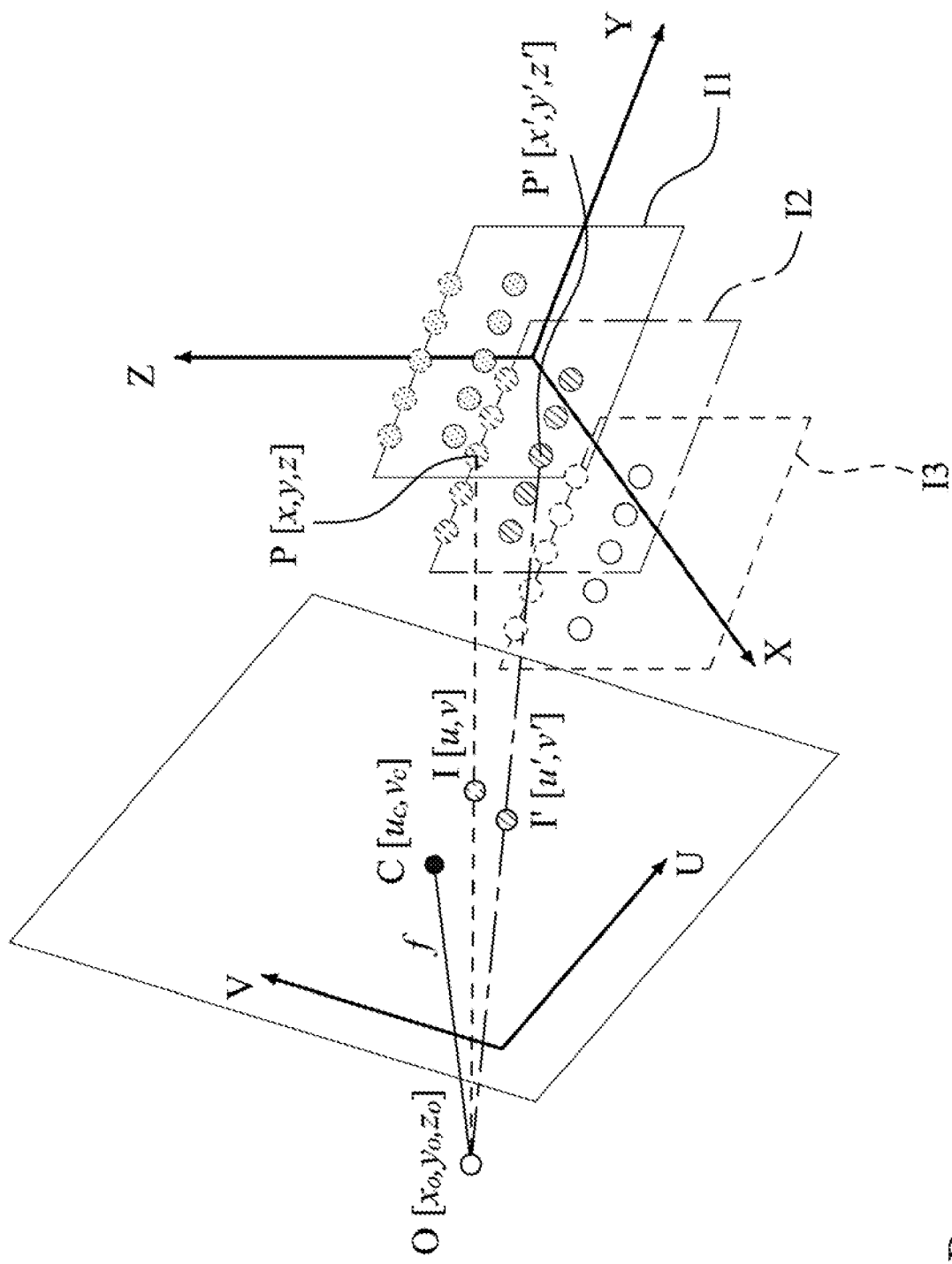
FIG. 10B shows a schematic view of a relationship between a plurality of image coordinates of a direct linear transformation and a plurality of top coordinates of the telescopic rods of FIG. 6.
Figure 11A:
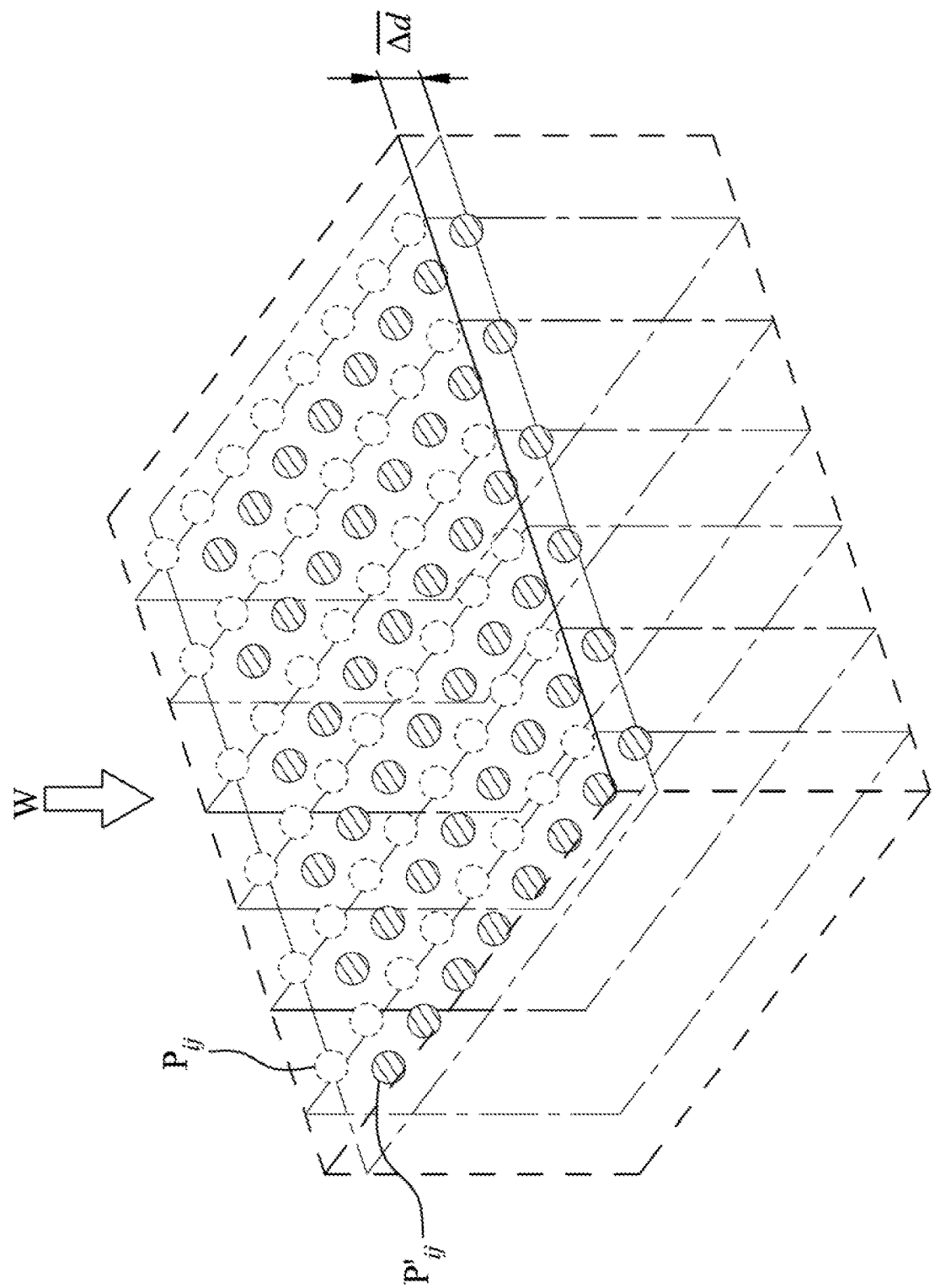
FIG. 11A shows a schematic view of a moving distance of the telescopic rods pressed by the foot of FIG. 10A.
Figure 11B:
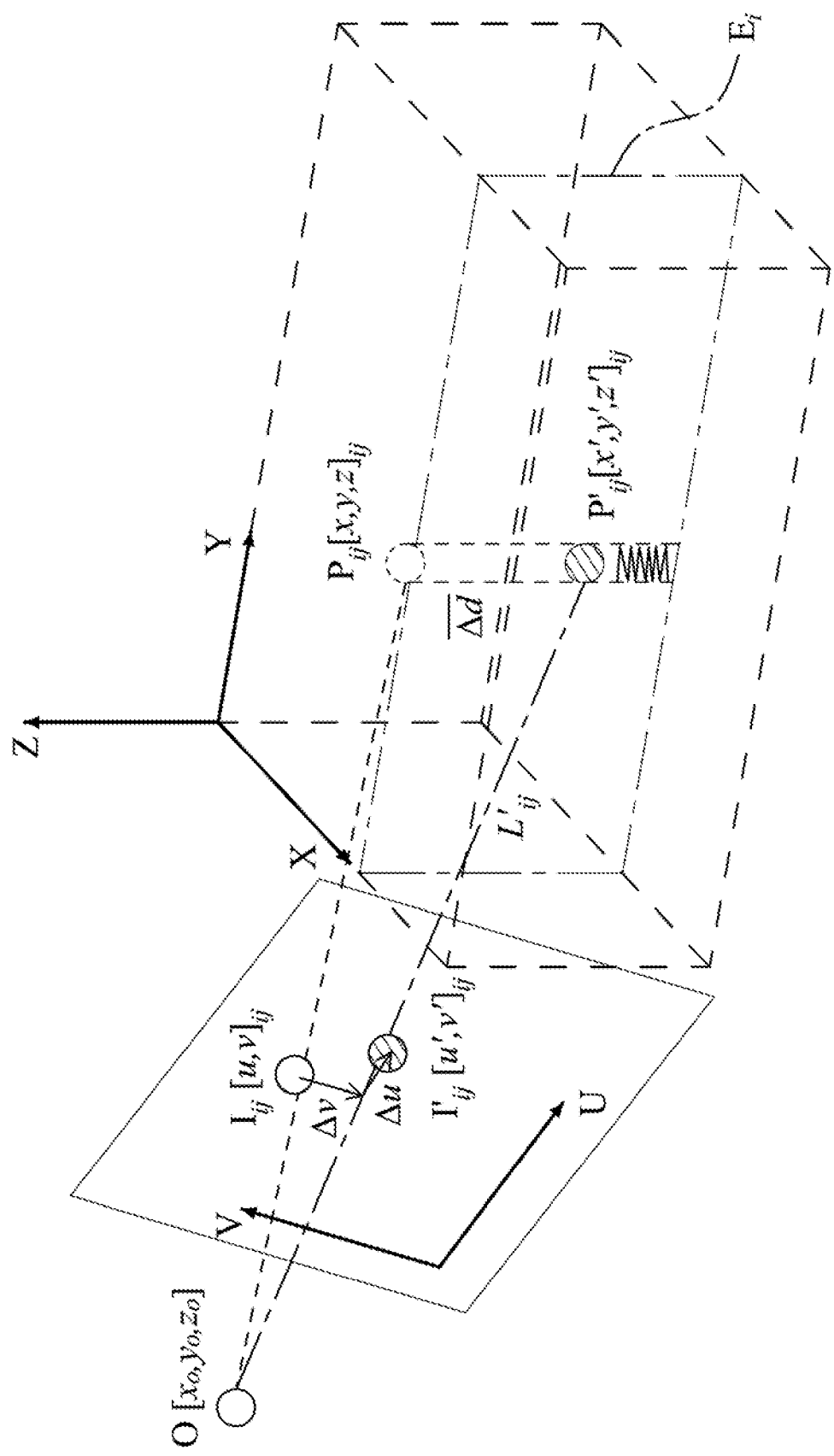
FIG. 11B shows a schematic view of a relationship between the image coordinates and the moving distance of FIG. 11A.
Figure 12:
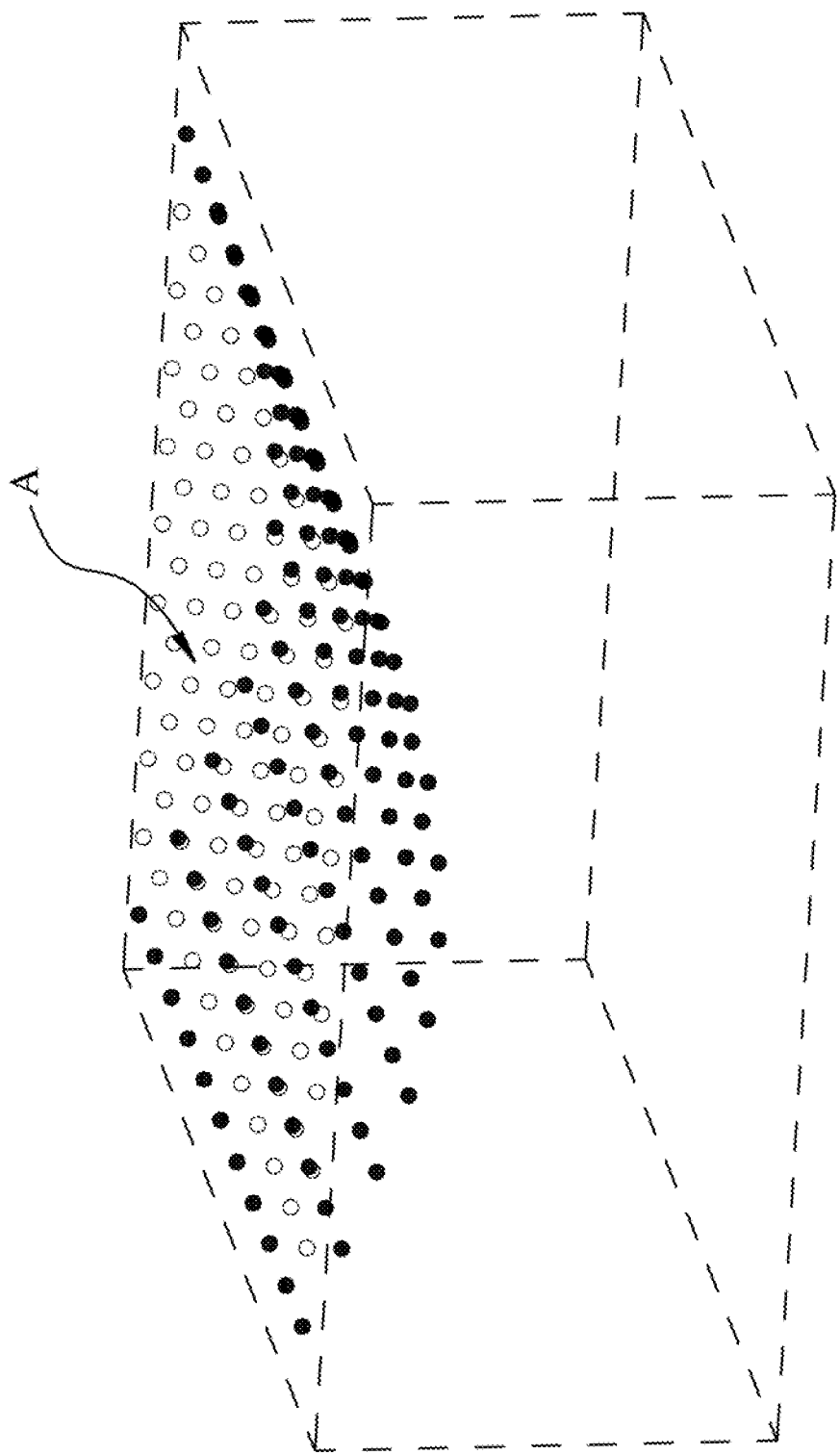
FIG. 12 shows a schematic view of a three-dimensional surface of the foot of FIG. 6.

FIG. 10A shows a schematic view of a relationship between a plurality of planes I1, I2, I3 of the telescopic rods 400 of FIG. 6; FIG. 10B shows a schematic view of a relationship between a plurality of image coordinates of a direct linear transformation and a plurality of top coordinates of the telescopic rods 400 of FIG. 6; FIG. 11A shows a schematic view of a moving distance $\overline{\Delta d}$ of the telescopic rods 400 pressed by the foot of FIG. 10A; FIG. 11B shows a schematic view of a relationship between the image coordinates and the moving distance $\overline{\Delta d}$ of FIG. 11A; and FIG. 12 shows a schematic view of a three-dimensional surface A of the foot of FIG. 6. In FIGS. 10A and 10B, there is a corresponding relationship between the image coordinates and the top coordinates of the telescopic rods 400. The lighting elements 910 of the light sources 900 generate one of the light colors via the telescopic rods 400 which are arranged in the same column (row). Two adjacent rows (columns) of the telescopic rods 400 generate different light colors, thereby improving the spatial resolution of the force sensing system. If the planes I1 has only one light color, the z-axis values of the top coordinates of the telescopic rods 400 are equal to each other. In order to perform the calculating step S24, a plurality of calculating parameters are established to obtain the three-dimensional data of the insole in the processor. The calculating parameters includes the top coordinates of the telescopic rods 400, the relationship between the planes I1, I2, I3 of the telescopic rods 400, the image coordinates of the direct linear transformation, the corresponding relationship between the image coordinates and the top coordinates of the telescopic rods 400, the moving distance $\overline{\Delta d}$ of the telescopic rods 400 and the relationship between the image coordinates and the moving distance $\overline{\Delta d}$, as shown in FIGS. 10B and 11B.

In the calculating step 824, a position correction between the image capturing device 1000 and the telescopic rods 400 is executed first. When the telescopic rods 400 are located at a reference position, one of the top coordinates of the telescopic rods 400 can represent P[x,y,z]. The processor may obtain the top coordinates of the telescopic rods 400 and the relationship between the planes I1, I2, I3 of the telescopic rods 400, as shown in FIG. 10B. Then, the image capturing device 1000 captures the image of the light colors transmitted through the telescopic rods 400. The image coordinate of the image capturing device 1000 can represent I[u,v]. The image coordinate I[u,v] is corresponding to the top coordinate P[x,y,z] of the telescopic rods 400. After that, a correction board having a weight W is put on the tops of the telescopic rods 400 for measuring the image coordinate I'[u',v'] and the top coordinate P'[x',y',z'] via the moving distance $\overline{\Delta d}$ of the telescopic rods 400, as shown in FIG. 11A. The moving distance $\overline{\Delta d}$ is correlated to the weight W of the correction board and an elastic parameter of the elastic members 500. When the top coordinate P[x,y,z] of the telescopic rods 400, the top coordinate P'[x',y',z'] of the telescopic rods 400, the image coordinate I[u,v] of the image capturing device 1000 and the image coordinate I'[u',v'] of the image capturing device 1000 are obtained, the direct linear transformation (DLT) is performed to obtain a transformation matrix T. The transformation matrix T represents the corresponding relationship between the image coordinates of the image capturing device 1000 and the top coordinates of the telescopic rods 400. Moreover, the transformation matrix T represents the focus position O of the image capturing device 1000 and the other spatial parameters, such as a focal length f, a center position C of an image plane, a zoom ratio S, etc. The transformation matrix T and the parameters can be described as follows:

$$\vec{B} = \overrightarrow{OI} = [\, u - u_0 \quad v - v_0 \quad -f \,];  \tag{1}$$

$$\vec{A} = \overrightarrow{OP} = [\, x - x_0 \quad y - y_0 \quad z - z_0 \,];  \tag{2}$$

$$\because \vec{B} // \vec{A} \Rightarrow \vec{B} = s\vec{A};  \tag{3}$$

$$\begin{bmatrix} u - u_0 \\ v - v_0 \\ -f \end{bmatrix}_{i,j} = s \cdot R \begin{bmatrix} x - x_0 \\ y - y_0 \\ z - z_0 \end{bmatrix}_{i,j} ;  \tag{4}$$

$$V = [\, x_0 \quad y_0 \quad z_0 \,]; \text{ and}  \tag{5}$$

$$T = \begin{bmatrix} R & V \\ [0 \ 0 \ 0] & 1 \end{bmatrix}.  \tag{6}$$

Wherein $\vec{B}$ is one vector between the focus position O and the image coordinate l[u,v] of the image capturing device 1000, and the vector $\vec{B}$ is corresponding to the image capturing device 1000; $\vec{A}$ is another vector between the focus position O and the top coordinate P[x,y,z] of the telescopic rods 400, and the vector $\vec{A}$ is corresponding to the telescopic rods 400; S is a zoom ratio; and R and V in the transformation matrix T represent a rotation matrix and a position vector, respectively.

Due to the linear relationship between the vectors $\vec{A}$ and $\vec{B}$, the zoom ratio S is used to describe the linear relationship, as shown n Eq. (3). The transformation matrix T is obtained by performing a least squares method, the top coordinates of the telescopic rods 400 and the relationship between the planes I1, I2, I3 of the telescopic rods 400, as shown in Eq. (6). The rotation matrix R and the position vector V represent the corresponding relationship between the image coordinates of the image capturing device 1000 and the top coordinates of the telescopic rods 400.

When we know all of the relationships and parameters, any kind of the moving distance $\overline{\Delta d}$ of the telescopic rods 400 can be calculated and obtained by the relationships and parameters via the image capturing device 1000 and the processor. For example, in FIGS. 11B and 12, the telescopic rods 400 of the mold is pressed by the foot of the standing user. The telescopic rods 400 are positioned by the sliding device 600. Then, the top coordinates $P'_{i,j}$ of the telescopic rods 400 and the image coordinate $I'_{i,j}$ of the image capturing device 1000 are captured by the image capturing device 1000. The image capturing device 1000 captures the image of the light colors transmitted through the telescopic rods 400. The corresponding relationship between the image coordinates and the top coordinates of the telescopic rods 400 is calculated by the processor. After executing the position correction and calculating to obtain Eqs. (1)-(6), the coordinates $P'_{i,j}$ can be obtained by calculating the focus position O and the three coordinates $I_{i,j}$, $I'_{i,j}$ and $P_{i,j}$. Accordingly, the moving distance $\overline{\Delta d}$ of the telescopic rods 400 can be obtained by subtracting $P'_{i,j}$ from $P_{i,j}$. When all of the moving distances $\overline{\Delta d}$ of the telescopic rods 400 are obtained, the three-dimensional surface A can be generated from the moving distances $\overline{\Delta d}$, as shown in FIG. 12.

When we know the moving distance $\overline{\Delta d}$ of the telescopic rods 400, the external force $F_{i,j}$ exerted on the telescopic rods 400 by the foot of the standing user can be calculated and obtained by Hooke's law. Hooke's law is $F_{i,j} = k \ \overline{\Delta d}_{i,j}$, wherein k is an elastic parameter of the elastic member 500.

In one embodiment, the method for getting the foot model further includes an obtaining colormap step. The obtaining colormap step is for obtaining a colormap from the image having the light colors via the light sources 900. The colormap is corresponding to the external forces exerted on the foot. In addition, a display device connected to the image capturing device 1000 and the processor shows the three-dimensional surface A and the external forces of the foot in real time, thereby giving the user visual feedback.

According to the aforementioned embodiments and examples, the advantages of the present disclosure are described as follows.

1. The mold and method of the present disclosure can show the three-dimensional surface and the external forces of the foot in real time, thereby giving the user visual feedback.

2. The mold and method of the present disclosure can manufacture an insole mold corresponding to the mold cavity of the mold. The insole mold may be used repeatedly, so that a measuring time can be reduced without re-measurement.

3. The mold and method of the present disclosure can completely make and maintain a mold cavity corresponding to the shape of the foot via the telescopic rods. Moreover, an insole mold corresponding to the mold cavity can be manufactured by the plastic material. The insole mold can be used repeatedly, so that the measuring time can be reduced without re-measurement.

4. The mold and method of the present disclosure can use a special shape of the abutting portions to increase the operational stability of the abutting portions. The telescopic rods cannot be rotated, so that the telescopic rods are more stable.

5. The mold and method of the present disclosure can utilize the drawer to conveniently put the insole material into the drawer module or take out the insole material from the drawer module so as to significantly shorten the manufacturing time.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A mold stepped on by a foot, comprising:
   a seat;
   a plurality of telescopic rods parallel to each other and disposed in the seat, wherein the telescopic rods stepped on by the foot generate a plurality of restoring forces;
   an image capturing device disposed on the seat, wherein the telescopic rods are captured by the image capturing device to generate a plurality of three-dimensional data of the telescopic rods; and
   an insole material disposed below the telescopic rods for molding an insole.

2. The mold of claim 1, further comprising:
   a plurality of light sources disposed on the seat, wherein the light sources are corresponding to the telescopic rods and illuminate the telescopic rods, and the light sources generate a plurality of light colors via the telescopic rods;
   wherein the light colors transmitted through the telescopic rods are captured by the image capturing device.

3. The mold of claim 2, wherein,
   the telescopic rods comprise a plurality of transparent portions; and
   each light source comprises a plurality of lighting elements having a plurality of light colors with different wavelengths, the light sources are corresponding to the transparent portions, respectively, and when telescopic rods are stepped on by the foot, each of the transparent portions is corresponding to one of the lighting elements.

4. The mold of claim 2, further comprising:
   a plurality of sensors turned on or turned off according to the telescopic rods;
   wherein each light source comprises a plurality of lighting elements having a plurality of light colors with different wavelengths, the light sources connected to the sensors, respectively, the light sources are corresponding to the telescopic rods, respectively, the lighting elements are turned on according to the sensors, respectively, and each turned-on lighting element generates one of the light colors.

\* \* \* \* \*